C. CARREYN.
FLUSH TANK.
APPLICATION FILED MAY 5, 1913.
1,102,870.
Patented July 7, 1914.
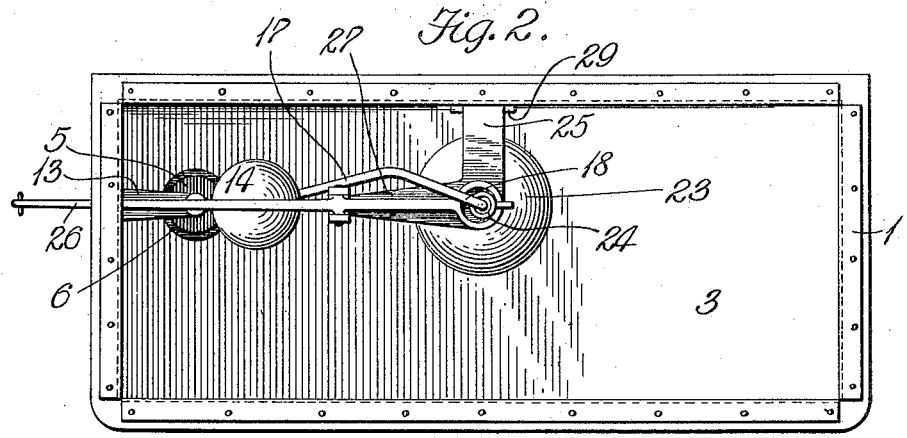
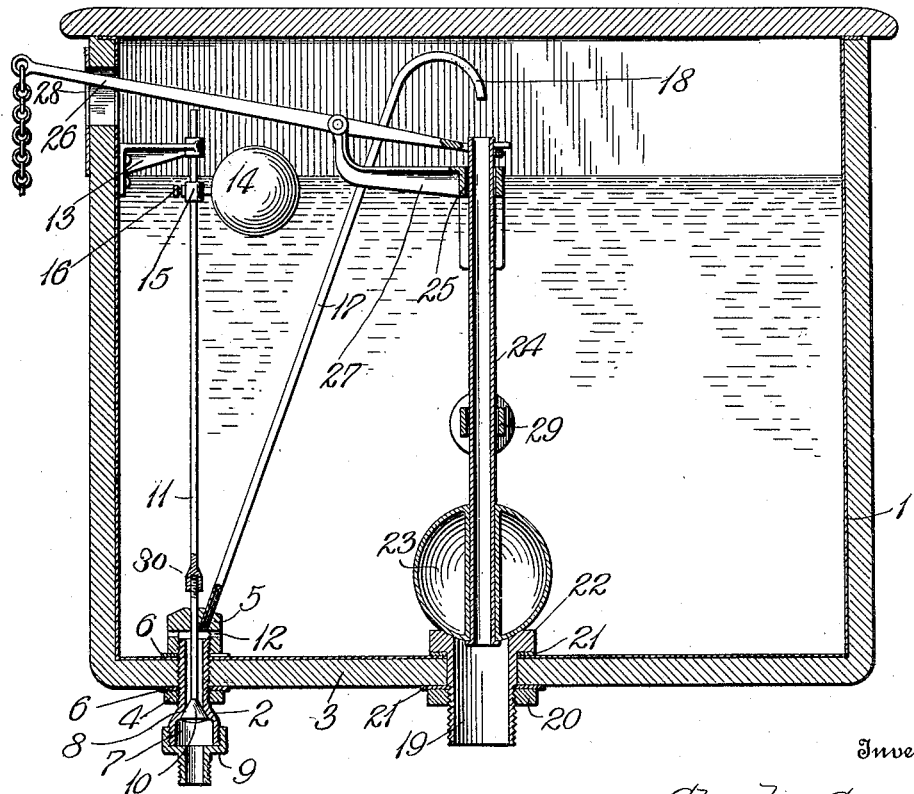

UNITED STATES PATENT OFFICE.

CHARLES CARREYN, OF DETROIT, MICHIGAN.

FLUSH-TANK.

1,102,870.

Specification of Letters Patent.

Patented July 7, 1914.

Application filed May 5, 1913. Serial No. 765,449.

*To all whom it may concern:*

Be it known that I, CHARLES CARREYN, a citizen of the United States of America, residing at Detroit, in the county of Wayne and State of Michigan, have invented certain new and useful Improvements in Flush-Tanks, of which the following is a specification, reference being had therein to the accompanying drawings.

This invention relates to a flush tank and a disposition of the supply and outlet valves therefor whereby the tank may be readily disconnected and bodily removed from the supply and outlet pipes without dismounting any of the valve mechanism.

The invention consists in the matters hereinafter set forth and more particularly pointed out in the appended claim.

In the drawings, Figure 1 is a view in vertical section of a tank and valve mechanism therein that embody features of the invention; Fig. 2 is a plan view thereof.

As herein shown in preferred form, a tank 1 of suitable design and material, is provided with an inlet valve casing 2 that is inserted through an opening in the base 3 of the tank and is secured therein between an outer stop-collar 4 and an inner fitting 5, gaskets 6 being employed to prevent leakage. The depending enlarged head 7 of the casing has an inner annular valve seat 8. A suitable cap 9, that is fitted for connection with the supply pipe, is screw-threaded on or otherwise secured over the head 7, the cap having an inner shoulder that forms an annular valve seat.

A conical closure 10 that is adapted to seal the opening through the annular seat 8 upwardly and through the cap 9 downwardly when detached has an upright stem 11 in sliding engagement with a guide opening through the fitting 5, the latter having side outlets 12 discharging into the tank. Preferably, the stem is jointed, a coupling 30 affording suitable connection. The stem is also in sliding engagement with a bracket 13 in the tank. A float 14 is adjustably secured as by a slide ring 15 and set screw 16 on the stem 11. A dribble pipe 17 extends from an upper outlet in the fitting 5 to the upper portion of the tank and has a downturned outlet end 18.

A tubular outlet fitting 19 in an opening in the base of the tank in which it is secured as by a stop-collar 20 and suitable gaskets 21, has an upper annular valve seat flange 22 that may be closed by a spherical float 23. The latter is in sliding engagement on a tubular stem 24 whose lower end portion is adapted to loosely rest on the flange 22. The upper end portion of the stem passes through a guide bracket 25 on the tank. An operating lever 26 is pivoted on an arm 27 of the bracket 25 to extend through a slot 28 in the tank wall, the inner end of the lever being articulated to the stem 24 to raise the latter and the other arm acting on the upper end of the stem 11 to depress the latter and force the closure 10 from seat. The outlet 18 of the dribble pipe 17 is arranged to discharge into the stem 24 whereby the desired amount of water may be admitted into the receptacle to which the tank is connected. A stop collar, bracket 29 or other means may be used to limit the upward movement of the float 23 on the stem 24.

In operation downward movement of the outer end of the lever lifts the sealing float from the outlet and simultaneously opens the inlet valve. When the lever is released the intake valve remains open until such time as the downward movement of the outlet float has closed the outlet valve and the level of the tank contents has reached the point where the float that controls the inlet valve has raised the closure of the latter to seat. The dribble pipe performs its usual function of supplying the desired amount of water through the outlet stem for the receptacle to which the tank is attached.

As a result of the connections and the arrangement of the valves in the base of the tank, the outer couplings between the valves and the supply and outlet pipes may be removed and the tank lifted bodily without disturbing the adjustment of the inlet and outlet valves. Or if the upper section of the inlet closure stem is unscrewed the closure seats itself on and seals the opening through the cap. As the valves are simple in construction they are readily assembled in operative relation to their controlling floats and lever and are not liable to be thrown out of adjustment or otherwise rendered inoperative.

Obviously changes in the details of construction may be made without departing from the spirit of my invention and I do not care to limit myself to any particular form or arrangement of parts.

What I claim is:—

The combination with a flushing tank, of a hollow casing having a tubular stem extending through the bottom of said tank, a ported fitting mounted upon the inner end of the tubular stem of said casing for detachably retaining the stem of said casing in engagement with said tank, said fitting having lateral oppositely disposed ports, a vertical port and an angularly disposed port adapted to accommodate a dribble pipe, said casing having a valve seat in the outer end thereof and the outer walls of said casing screwthreaded and adapted to receive a cap, and a valve housed within said casing and adapted to engage said valve seat, said valve having a rod extending through said stem and guided by the vertical port of said fitting.

In testimony whereof I affix my signature in presence of two witnesses.

CHARLES CARREYN.

Witnesses:
ANNA M. DORR,
J. A. NOELKE.

Copies of this patent may be obtained for five cents each, by addressing the "Commissioner of Patents, Washington, D. C."